United States Patent [19]
Baum et al.

[11] Patent Number: 5,159,626
[45] Date of Patent: Oct. 27, 1992

[54] MULTI-LINE TELEPHONE SWITCHING SYSTEM

[75] Inventors: Elliot I. Baum, Dix Hills; Arthur Lekstutis, Lake Ronkonkoma, both of N.Y.

[73] Assignee: Execudyne Ltd., Ronkonkoma, N.Y.

[21] Appl. No.: 550,753

[22] Filed: Jul. 10, 1990

[51] Int. Cl.⁵ .................................... H04M 1/64
[52] U.S. Cl. ............................ 379/67; 379/88; 379/79; 379/82; 379/266
[58] Field of Search ............ 379/67, 70, 76, 81, 379/84, 74, 77, 79, 82, 88, 215, 266, 87

[56] References Cited

U.S. PATENT DOCUMENTS

| | | | |
|---|---|---|---|
| 3,193,620 | 7/1965 | Marheine | 379/74 |
| 3,701,850 | 10/1972 | Ando | 379/82 |
| 4,382,396 | 5/1982 | Theis | 379/211 |
| 4,506,346 | 3/1985 | Bennett et al. | 379/166 |
| 4,607,144 | 8/1986 | Carmon et al. | 379/79 |
| 4,674,115 | 6/1987 | Kaleita | 379/199 |
| 4,763,353 | 8/1988 | Canale et al. | 379/266 |
| 4,878,240 | 10/1989 | Lin et al. | 379/67 |
| 4,893,335 | 1/1990 | Fuller et al. | 379/200 |
| 4,930,150 | 5/1990 | Katz | 379/67 |
| 4,930,152 | 5/1990 | Miller | 379/89 |
| 4,947,421 | 8/1990 | Toy et al. | 379/215 |
| 4,975,944 | 12/1990 | Cho | 379/215 |
| 4,975,945 | 12/1990 | Carbullido | 379/212 |

Primary Examiner—Jin F. Ng
Assistant Examiner—Huyen D. Le
Attorney, Agent, or Firm—Frishauf, Holtz, Goodman & Woodward

[57] ABSTRACT

An answering machine is coupled to a multi-line switching system which in turn is coupled to a plurality of incoming telephone lines in parallel with the telephone equipment or the like which is also connected to the incoming telephone lines. The switching system includes a controller for switching an incoming call on any of the incoming lines to the answering machine after a preselected number of rings including zero rings. The controller picks-up and holds an incoming call on any of the lines whenever the answering machine is busy processing a previously received call, and connects the thus held call to the answering maching upon completion of the processing of the previously received call by the answering machine. The controller scans the incoming lines and senses when incoming calls are received. The incoming calls are seized by the controller and are handled, for example by generating voice messages to the callers while the calls are on hold, to prevent the callers from hanging up and disconnecting from the system.

44 Claims, 8 Drawing Sheets

MULTI-LINE TELEPHONE SWITCHING SYSTEM

BACKGROUND OF THE INVENTION

This invention relates to a multi-line telephone switching system, and more particularly to a system for routing multi-line telephone inputs to output devices, such as answering machines, facsimile machines, modems, or the like, on a line-by-line basis.

Throughout the following description, the term "answering machine" will be used to describe the answering device to which the present invention is connected, it being clear that the term "answering machine" is being used generically and includes within its scope any other type of answering device, such as facsimile machines, modems, computers, telephone answering machines, data receiving devices or any other device which answers telephone lines automatically.

When a plurality of telephone lines are to be coupled to a single (or plural) answering machine, a problem exists if the answering machine or the like is busy with another call. In such case, if a call comes in on a second line, the answering machine cannot interrupt its connection to the first call, and the second call continues to ring. Sometimes, the caller on the second line will merely hang up if the phone is not answered. In manually operated switchboards, this problem is overcome by the operator putting the first call on hold, then switching over to the second call to answer same, informing the second caller to "please wait" or the like, and then going back to the first call for continuing the attention to the first call. In automatic answering devices, however, this cannot be done, and the second incoming call is ignored until the answering machine is free.

The object of the present invention is to provide a switching system which can be connected to an automatic answering device, and which answers and manages calls coming in on additional lines, even when a first line is busy and is connected to the answering device.

SUMMARY OF THE INVENTION

According to a first aspect of the invention, a multi-line telephone switching system for answering incoming telephone calls, on a plurality of incoming telephone lines, comprises an answering machine for selectively transmitting information to and receiving information from said incoming lines on a one-at-a-time basis; and control means coupled to said plurality of incoming telephone lines and to said answering machine for switching an incoming call on any of said lines to said answering machine after a preselected number of rings including zero rings, said control means including means for picking up and holding an incoming call on any of said lines whenever said answering machine is busy processing a previously received call, and means for connecting the thus held call to the answering machine upon completion of the processing of the previously received call by the answering machine.

According to a second aspect of the invention, a multi-line telephone answering system for use with a plurality of telephone lines, a plurality cf telephones being connected to said lines, comprises, switching means coupled to said lines and to said telephones for transferring an incoming call from a busy telephone to a free telephone; control means coupled to said switching means and including means for picking up and holding an incoming call if said incoming call is not answered after a preselected number of rings, including zero rings, by said free telephone; and an answering machine means coupled to said control means for answering incoming calls on a one-at a-time basis which are not answered after said preselected number of rings; said picking-up and holding means of said control means including queuing means for queuing incoming calls to use the answering machine means whenever the answering machine means is busy processing a previously received call, and means for generating a ring signal to the answering machine means upon completion of the processing of the previous call by said answering machine means.

BRIEF DESCRIPTION OF THE DRAWINGS

FIG. 2 is a block diagram of the apparatus of the present invention, showing how it is interconnected with incoming telephone lines and an answering machine or the like;

FIG. 7 is a basic block diagram of a modified arrangement wherein the unit 10 of the present invention is connected after a PABX system or like.

DETAILED DESCRIPTION

Figure 1:
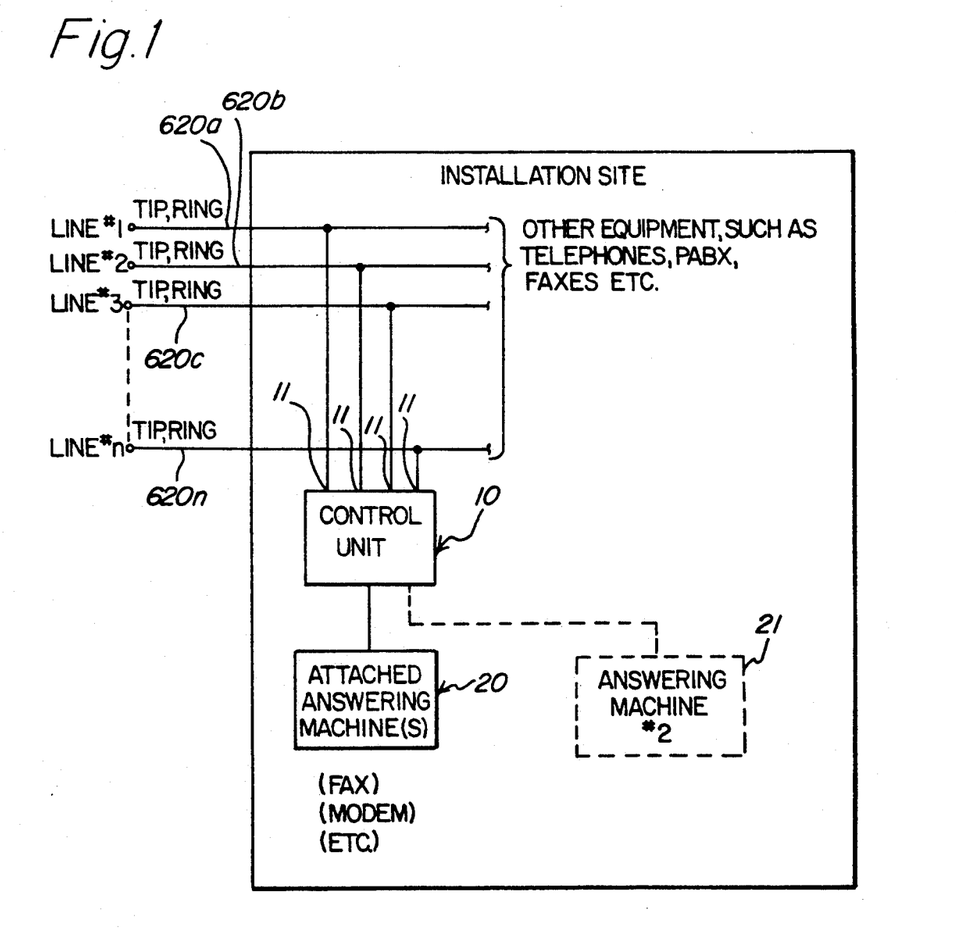
FIG. 1 is a basic block diagram showing how the apparatus of the present invention is connected to incoming lines and existing answering machines.

Referring to FIG. 1, a control unit 10 of the present invention has a plurality of inputs 11 to which of a plurality of incoming telephone lines 1 . . . n on lines 620a, 620b, 620c, 620n are connected. The number of incoming lines is not limited, and may be any number, as desired, as seen from FIG. 1. Preferably, the control unit 10 has a number of input jacks 11 for receiving inputs from the respective N incoming telephone lines. Alternatively, the line connections can be hard wired or connected to control unit 10 in any other manner.

The unit 10 is connected in parallel with the conventional telephones, PABX, facsimile machines, answering devices, or the like. As mentioned above, for convenience, this description is given with respect to an answering machine. One or more answering machines 20, 21, etc. are connected to respective outputs of unit 10.

Figure 2:
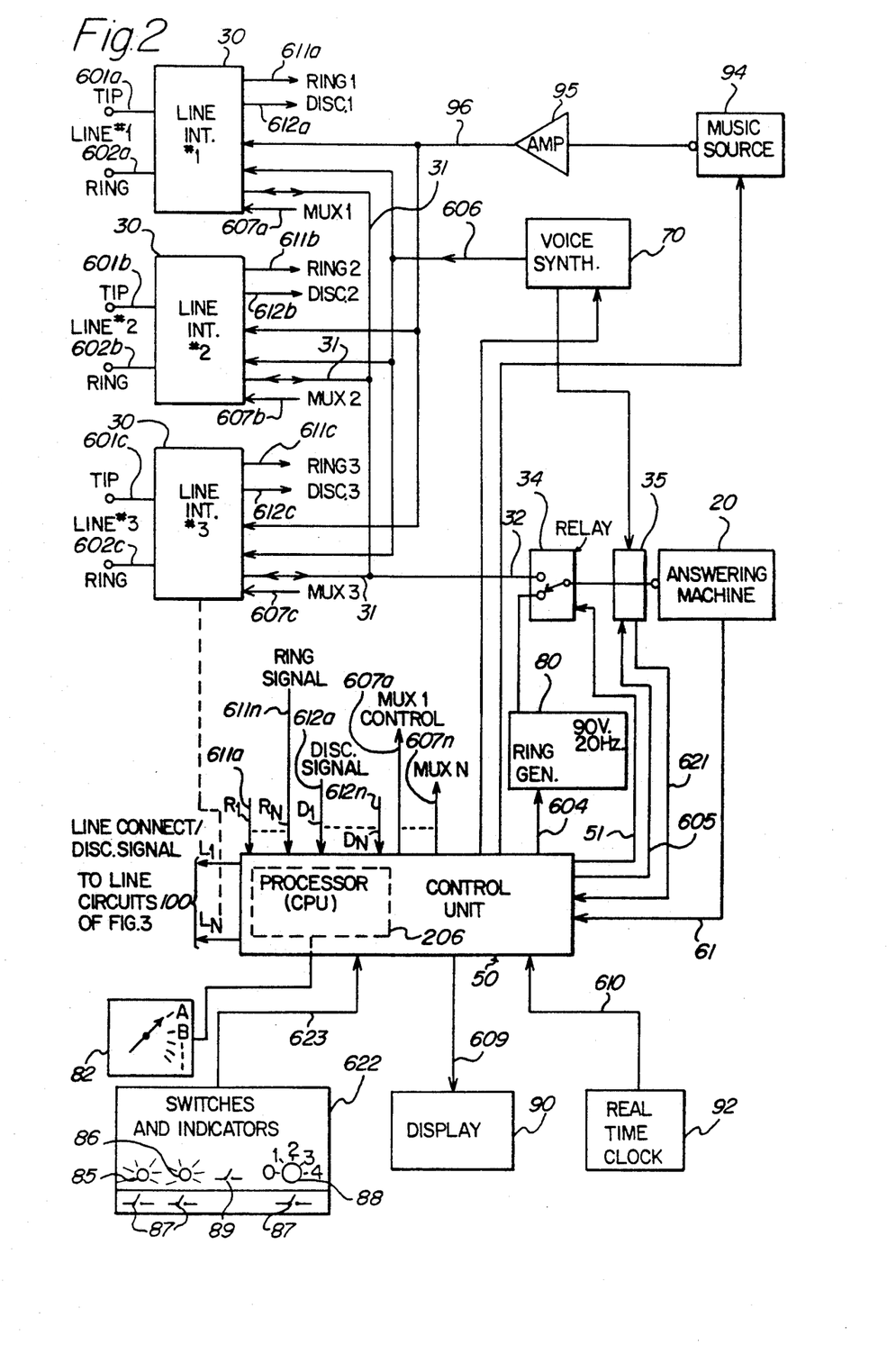
Figure 3:
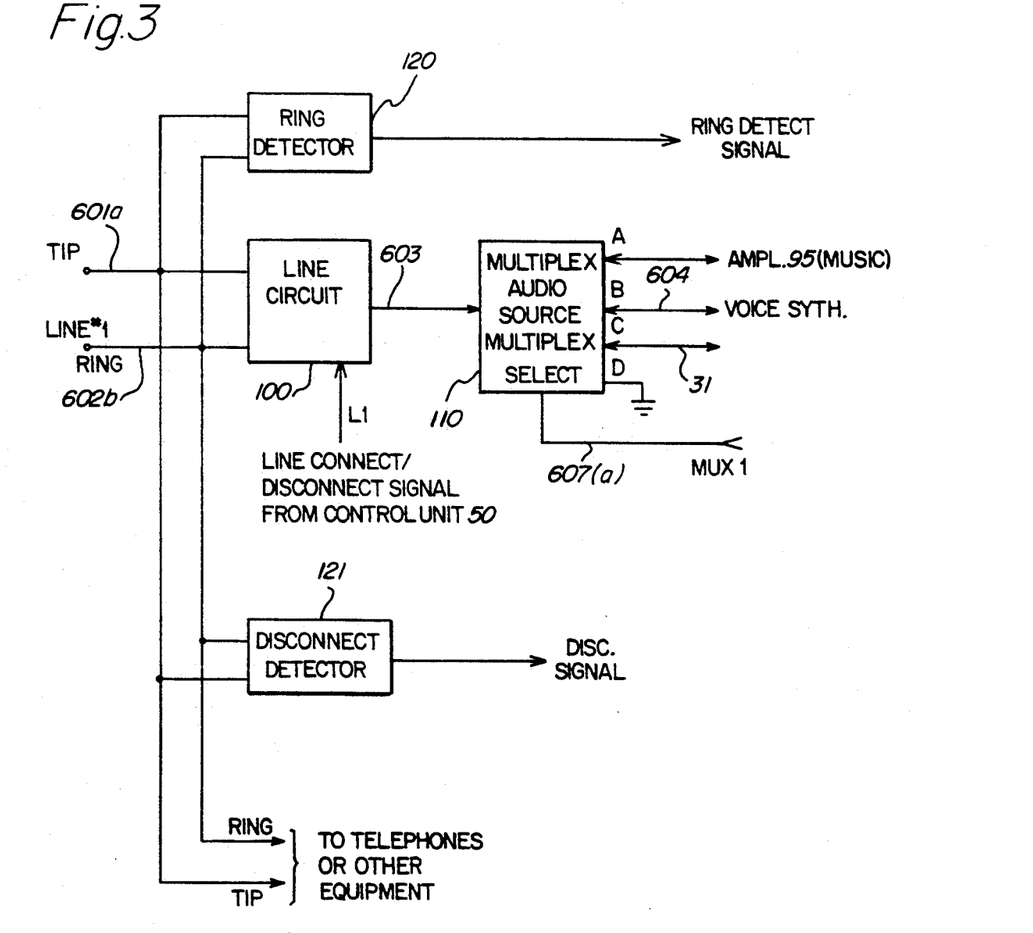
FIG. 3 is a detailed block diagram of the line interface unit shown in FIG. 2.

Referring to FIGS. 2 and 3, an example of use of the present invention will now be given with respect to a single answering machine 20 in a system arranged to pickup on four rings. When a call comes in on any of the incoming lines, 620a, 620b, 620c, . . . 620n of FIG. 1 the ring signal will be detected by the ring detector 120 (FIG. 3) of unit 10, connected to tip terminal 601(a) as well as by the other equipment, such as telephones, PABX, facsimile machines, etc. which are connected in parallel to the incoming telephone lines. If none of the telephones, facsimile machines, etc. connected to the "ringing" incoming line has been picked up on four rings (as determined by the processor in control unit 50, (FIG. 2) the unit 10 will "seize" the ringing incoming line, answer the line, and state, for example, "please hold on" or some other predetermined phrase, by means of a voice synthesizer 70, tape recorder message, or the like. If the answering machine 20 is not in use at that time, the call will be routed to the answering machine 20 and the answering machine 20 will respond in its normal manner. During the time that the answering machine 20 is active or in use, either sending out an outgoing message (OGM) or receiving an incoming message on a telephone line, calls coming in on the other lines will be picked up by the unit 10 which will state the same audible message, for example "please hold on" or other predetermined phrase to the other incoming callers. The unit 10 puts the calls on the other lines on "hold".

Periodically, while these other lines are on "hold", the unit 10 will grab the respective lines 620a, 620b, 620c, ... 620n of FIG. 1 and state again a predetermined message, such as "please hold on". This sending of a periodic message to the lines on "hold" is to prevent the callers on hold from "hanging up". When the answering machine 20 has completed its processing cycle from a previous call, the unit 10 will then connect the answering machine 20 to another incoming line which has already been put on hold. This could be done in the sequence in which the calls have been received, or in some other prearranged priority sequence. The unit 10 will make the connection by detecting that the output device (the answering machine 20) is not in use via line 621, and will create and send a "ring signal" via ring generator 80 to the answering machine 20 as if the answering machine 20 was receiving the ringing signal from the incoming telephone line. The answering machine 20 will then pick up the incoming line after a predetermined number of rings and operate in its conventional fashion. This operation is repeated for other incoming lines which were or are put on "hold" while the answering machine is busy.

The unit 10 may be provided with indicators 85, 86 thereon (see FIG. 2) which indicate various operating conditions thereof. Indicators 85, 86 will be provided for each line, only one set being shown in FIG. 2 (see block 622). For example, four conditions could be displayed by two indicators 85, 86 of block 622 on the unit 10, such as (i) answering machine 20 or other output device in use; (ii) the call is on "hold" awaiting further attention; (iii) telephone is in use as a regular telephone; and (iv) the line is not in use. Other operating conditions could be indicated as well, and more than two indicators 85, 86 could be provided. For example, condition (i) could be designated by a green light 85; condition (ii) could be designated by a green flashing light 85 condition (iii) could be designated by red light 86; and condition (iv) could be designated by none of the lights 85, 86 being lit.

The unit 10 may also be provided with switches 87 of block 622 individually associated with the respective incoming telephone lines with which respective incoming lines can be cut-off from the unit 10 to effectively prevent unit 10 from controlling that particular line. The switches are coupled via lead line 622 to the processor of the control unit 10. For example, if six lines are in a particular system and it is desired that the answering machine 20 pick up on the first two lines only, then the respective switches 87 are kept in the "on" position for lines 1 and 2, and in the "off" position for lines 3, 4, 5 and 6. The unit 10 controls its own output device (i.e. answering machine) 20 and allows the rest of the parallel connected telephone system to function in its normal manner.

Referring to FIG. 2, the unit 10 of the present invention comprises a plurality of line interface units 30, which are respectively connected to incoming telephone lines via tip terminals 601a, 601b, 601c and ring terminals 602a, 602b, 602c. In FIG. 2, only three incoming telephone lines and three line interface units 30 are shown, it being clear that any number of incoming telephone lines can be used, a corresponding number of line interface units 30 being provided. As mentioned with respect to FIG. 1, the line interface units 30 are connected in parallel with the incoming lines. Outputs from line interface units include ring signals on lines 611a, 611b, 611c and disconnect signals on lines 612a, 612b, 612c, (FIG. 2). Each of the line interface units has an output 31 which are connected together in parallel to a line 32 which is connected to a switching device 34 which is controlled by the control unit 50. Under normal operating conditions, the switch 34 may be in a state to connect the line 32 to the answering machine 20 or the like. Therefore, when an incoming line is ringing, the line interface units 30 detect the ringing line, (ring detector 120 of FIG. 3) and produce an output (via audio source multiplex unit 110 of FIG. 3) which is connected to the switch 34 over line 32, and via interface 35 and the answering machine 20 answers in the normal manner. Alternatively, when an incoming line is ringing, the ring signal is detected at control unit 50 on one of lines R1-RN of FIG. 2. After detection of the line which is ringing, the control unit 50 may energize ring generator 80 via lead 604 and switch the switch 34 via lead 605 over to connect the ring generator 80 to the answering machine interface 35. In this alternative arrangement, the control unit 10 detects that ringing has taken place for a predetermined number of rings (for example four rings, three rings, or even zero rings), the answering machine is generally set to its position whereby it will answer at the least number of rings applied thereto. When the answering machine 20 is busy, a signal is sent on line 61 to the control unit 50 to inform the control unit 50 that the answering machine is "busy". When the next line is ringing (any of lines 1–3 via tip terminals 601a, 601b, 601c and ring terminals 602a, 602b, 602c) in FIG. 2), the control unit 50 controls the line interface unit 30 corresponding to the ringing incoming line over "line connect/disconnect signal line" L1-LN to cause the respective line circuit 100 of a line interface unit 30 (FIG. 3) to pick up, and to also cause via conductor 603 the voice synthesizer 70 to generate a voice message on conductor 604, such as "please hold on" or the like. The voice message is fed to the telephone via audio source multiplexer 110 of a line interface unit 30 under control of the MUX signal output via lead 60 from control unit 50. The voice message is periodically generated by the voice synthesizer 70 while the second incoming call is on "hold". When the answering machine 20 is free (that is, it has completed its processing cycle with respect to the previous call), a signal is sent on line 61 of FIG. 2 to the control unit 50 to indicate that the answering machine 20 is free. At this point, the control unit 50 via conductor 605 switches switch 34 over to the ringing generator 80, and causes via conductor 604 the ringing generator 80 to generate a ringing signal to simulate a conventional telephone ringing signal, which ringing signal is fed to the answering machine 20 via switch 34 and answering machine interface 35. When the answering machine 20 picks up, the control unit 50 switches switch 34 back to the output line 32 so that the next incoming line is picked up and answered by the answering machine, under control of the control unit 50. Time and date stamping are preferably also provided, as described later hereinbelow. If more than one line was on hold, the control unit issues a signal to the respective line interface 30 for the next-to-be-answered telephone (depending upon either system priority or order in which calls were received) to cause the answering machine 20 to answer the line which was on "hold". The voice synthesizer 70 continues to periodically send out via conductor 606 voice messages to only those lines which are still on "hold", through the respective multiplex units 110 of the line interface units 30 under control of the MUX output 607, 608 of the control unit 50. The second call, which has now been answered by the answering machine, is handled in the same manner as described above, as are remaining calls on "hold".

A display unit 90 is connected via conductor 609 to the control unit 50 and may include a display for phone umber called, time and date, etc.

A real time clock 92 is provided and connected via conductor 610 for timekeeping purposes, in order to provide information for a "date and time stamp" for the message recorded by the answering machine, or to keep track of time of calls, etc., and to record same.

If it is desired to provide "music on hold", a music sound source 94 is provided, as is conventional, and is connected to the line interface units 30 by means of an amplifier 95 and a signal line 96, which is connected in parallel to each of the line interface units 30. The "music on hold" feature can be individually connected or disconnected, depending upon either switch setting on the unit, or depending upon pre-programmed control conditions in the control unit 50. With "music on hold", when the voice synthesizer 70 outputs its voice message, the music is interrupted, and is started again after completion of the voice message. This is controlled by the audio source multiplex unit 110 in the line interface units 30, under control of the MUX signals from lines 607 . . . 607n from the control unit 50.

FIG. 3 illustrates a detailed block diagram of a typical line interface unit 30 according to the present invention. Only a single such unit is shown in FIG. 3 for ease of explanation. The incoming line (line number 1 in this example) is connected to the line circuit 100 via tip 601(a) and ring 602(a) terminals, the output of which is connected to a multiplex device 110 via conductor 603. The incoming line is also connected to a ring detector 120 and a disconnect detector 121, in parallel with the line circuit device 100 for generating a "ring" output signal and a "disconnect" output signal, respectively. The line circuit 100 places a load across the incoming line to simulate answering of a phone, under control of the line connect/disconnect signal $L_1$ from control unit 50.

The system of the present invention will now be described in greater detail with respect to the flow charts of FIGS. 4 and 5, which illustrate the control sequences of a preferred embodiment of the invention. In the embodiment to be discussed below, time and date stamping of the incoming message are provided, and the number of rings before pick-up is detected by the control unit 50, rather than by the answering machine. In the embodiment to be described below, if the answering machine has a setting for "number of rings before pick-up", the setting is preferably set to the minimum number of rings, preferably zero or one, to improve system response time. The number of rings before pick-up can be set manually by an operator by manually operating dial 88 in FIG. 2 which is coupled to the control unit. Dial 88 in FIG. 2 shows settings for zero, one, two, three and four rings, but other settings could be provided, as desired.

There are two basic processes that run concurrently in the central processor (CPU) of control unit 50. The first one (process one of FIG. 4) runs continuously and is responsible for answering all of the incoming calls, putting them on hold, and passing them to process two (FIG. 5) when process two has time to handle the incoming call. The second process (process two of FIG. 5) will take an incoming call handed off to it from process one and connect it to the telephone answering machine 20.

These two processes are run in turn on the processor of control unit 50 in a time multiplexed fashion so that they become basically concurrent. In addition, process two may have several copies of itself running at the same time, one for each telephone answering machine connected to the apparatus of the invention. That is, process two only handles one answering machine and must have multiple copies running for multiple answering machines.

Figure 4:
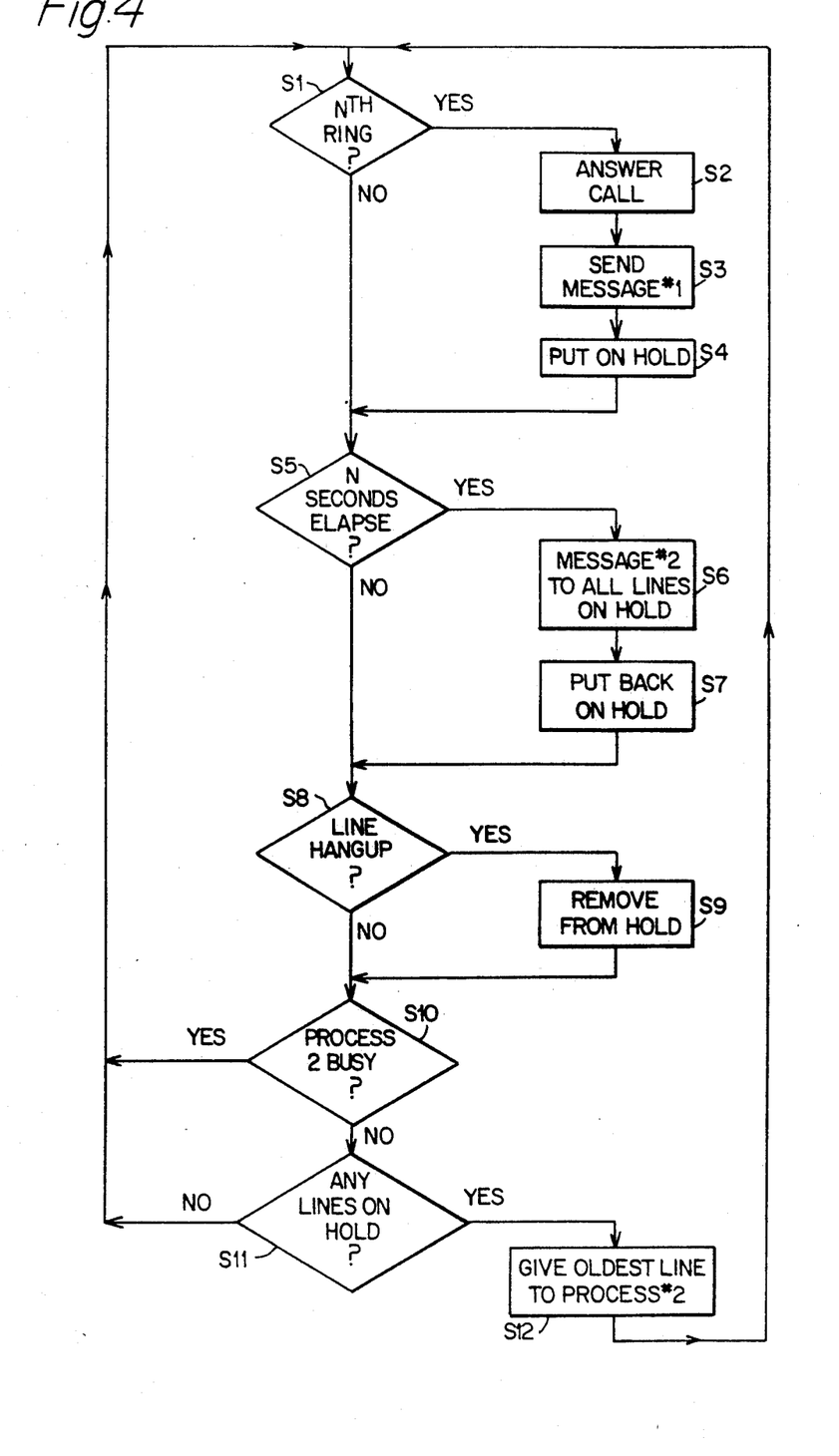
FIG. 4 is a flow chart of one operating process state of the present invention.

STEPS OF PROCESS ONE (FIG. 4)

S1. All incoming phone lines are scanned in control unit 50 by scanning the ring lines R1–RN by the processor. Any lines that have ringed the programmed number of times over a period of time consistent with a single incoming call will be processed by, steps S2 through S4.

S2. The incoming call is answered. This is done by the line circuit 100 (FIG. 3) providing a current path in line interface unit 30 between tip and ring of the incoming phone line.

S3. The audio source multiplexer 110 in the line interface unit 30 is switched by the appropriate MUX signal from control unit 50 to the speech or voice synthesizer 70 to cause message number one to be played out from the voice synthesizer 70 to the calling party. This message states something to the effect that the call is being answered automatically, the lines are all busy, and to please wait until the call can be processed. Other messages could be generated, as desired.

S4. The audio source multiplexer 110 is switched to the music source 94 (via amplifier 95) to provide music on hold to the caller. The time of the call is noted in the control unit 50 for processing the calls in order. This call is now on hold.

S5. After a period of time that is programmable (for example, 20 seconds or more), the process flow branches off to step S6. This is repeated every 20 seconds, for example.

S6. The control unit 50 of the present invention switches all of the audio source multiplexers 110 of all of the lines on "hold" to the speech synthesizer 70, and causes message number two to be played out to all of the calling parties on hold. The message may state something to the effect that the call is still on hold and to please continue waiting, or the like.

S7. The audio source multiplexers 110 of all calls on hold is switched to the music source 94 to provide music on hold to the caller. This call is now back on hold.

S8. All lines on hold are scanned by control unit 50. Any calls where the calling party has hung up are detected by, for example, detection of the DISC signal from the line interfaces. In the case of a detected disconnect or hang-up, the process flow branches to step S9.

S9. Any calls on hold where the calling party has hung up are taken off hold and the current loop between tip and ring is broken by controlling the line circuit 100 in the line interface responsive to line connect/disconnect signal from control unit 50.

S10. If all of the copies of process two are busy (that is all of the answering machines are busy handling calls), process flow branches back to step S1.

S11. If no lines are on hold, the process flow branches back to step S1.

S12. The line that is currently on hold for the longest period of time is taken off hold and given over to process two.

Figure 5:
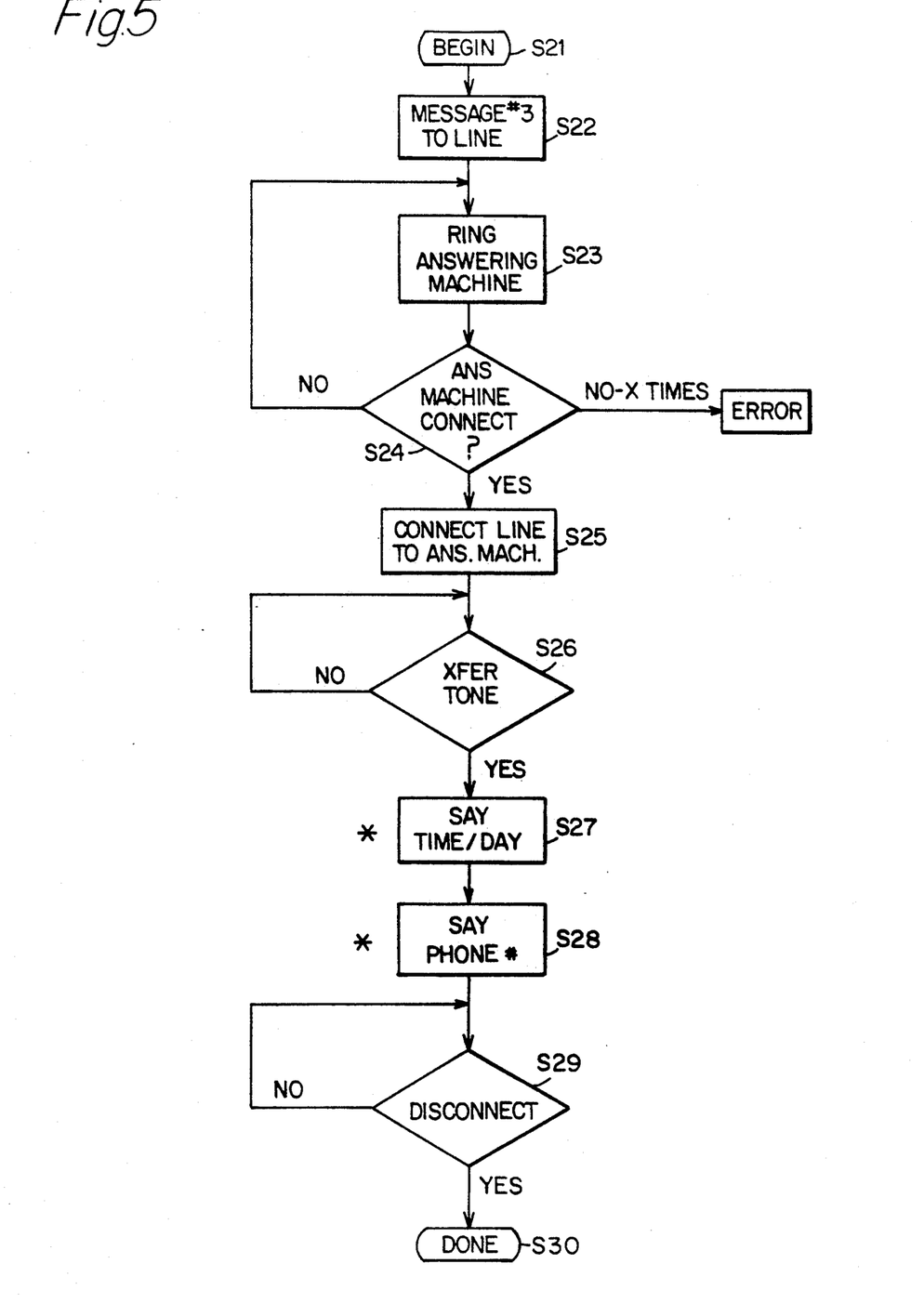
FIG. 5 is a flow chart of a second operating process state of the present invention.

STEPS OF PROCESS TWO (FIG. 5)

S21. Process two is initiated by process one. When process one has a call on hold to be answered by the telephone answering machine, it invokes process two to answer it.

S22. The audio source multiplexer 110 of the nest line to be processed is switched to the speech synthesizer 70 to allow message number three to be played out to the calling party. This message states something to the effect that the call is now being answered, or the like. Since a time and date stamp will be generated first, the caller may be instructed to wait until completion of the time and date announcement before leaving a message.

S23. A ring signal is generated by ring generator 80 under control of control unit 50 and is sent to the answering machine via switch 34 and answering machine interface 35 to cause the answering machine to begin its processing cycle.

S24. If the answering machine has not answered after a given period of time, the process branches back to step S23 to ring the answering machine again. If this process is repeated X number of times (for example, five times), the system branches to the "error" step and the call may be disconnected, an alarm may be generated, etc.

S25. The answering machine is connected via the audio source multiplexer 110 of the line being processed and through switch 34 to the calling party. At this point the answering machine will typically play its outgoing messages.

S26. On detection of the answering machine's transfer tone (i.e., the usual "beep"), indicating that the outgoing message (OGM) is complete and that the incoming message is to be recorded, the process proceeds to step S27. The transfer tone is received by the answering machine interface unit 35 and is fed to the control unit 50, wherein it is detected by a tone detector circuit to be described later.

S27. The speech synthesizer 70 is connected via the answering machine interface 35 to the answering machine to record the time of the call (and the date) on the telephone answering machine as part of the incoming message. This is provided for telephone answering machines that do not already have this option built in. While the time and date is being recorded the answering machine via the speech synthesizer 70, it is possible for the incoming caller to talk at the same time, thus obscuring a portion of the message and/or obscuring the intelligibility of the time and date recording. The caller can be instructed via the outgoing message (OGM) from the telephone answering machine to wait for the time and date information to be recorded before giving a message (since the system is connected, the incoming caller can "hear" the time and date being recorded). Alternatively, the caller can be instructed to wait for a second "beep" before leaving the message, which second "beep" can be generated by the control unit 50 after the voice synthesizer 70 has completed generating the time and date data.

S28. The speech synthesizer 70 is connected via the answering machine interface 35 to the answering machine to cause the speech synthesizer, under control of the control unit 50, to record the telephone number of the line of the incoming call being processed. This is done just after recording of the time and date, but could also be done before the time and date are recorded.

S29. The process will proceed to step S30 on detection of a disconnection of either the calling party or the telephone answering machine. If the call is not disconnected, the system holds onto the line and permits the caller to leave a message on the answering machine. After the caller hangs up, the disconnect is sensed and the process proceeds to step S30.

S30. The call is disconnected by breaking the current loop between tip and ring by the line circuit 100 of the line interface unit 30. Process two is now terminated until process one invokes it again.

Steps S26 to S28 described above are optional. These steps are used for units equipped to provide time/day stamping and where this option has been enabled. A switch 89 (see FIG. 2) is provided to enable or disable time/day stamping.

The time and day are kept track of by the central processor. The real time clock 92 (i.e., a Z80-CTC clock timer) interrupts the processor periodically to update the time. This is only exemplary, and other known techniques for keeping track of time and date may be used.

Transfer tone detection for step S26 of process two is accomplished via one or more phase locked loop (Pll) tone detectors (LM567 for example). In order to be able to work with most any model telephone answering machine, the phase locked loop (PLL) must be set and calibrated according to the expected tone frequency(s). This is done by replacing a conventional external oscillator timing resistor with a microprocessor controllable variable resistor, as will be described in detail below with reference to FIG. 6

Figure 6:
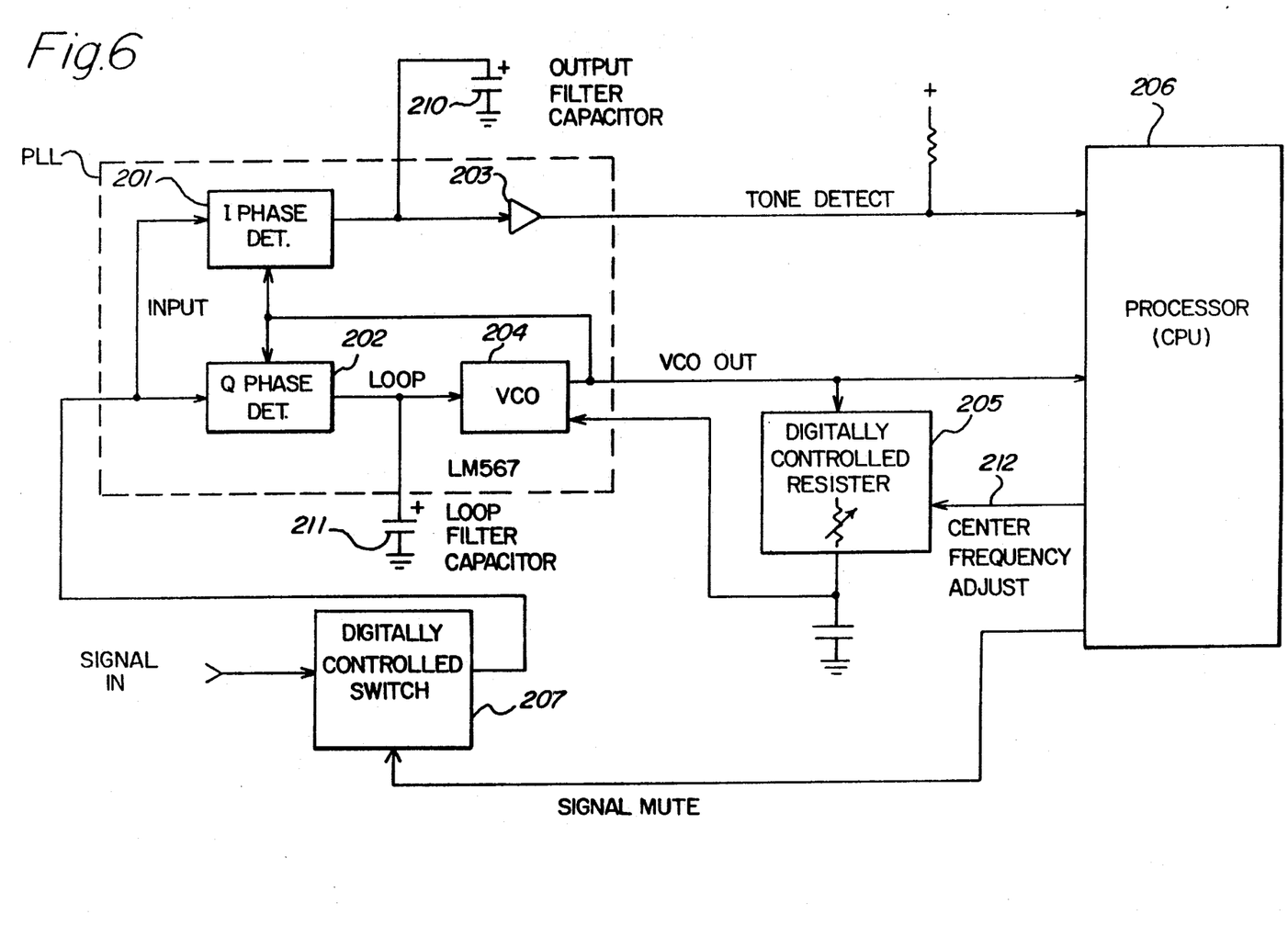
FIG. 6 is a schematic block diagram of tone frequency detection circuitry of the present invention.

The tone detector of the present invention, as illustrated in FIG. 6, enables the system to reliably and inexpensively detect different tone (or "beep") signals produced by different answering machines. With the addition of a digitally controlled resistor 205 and a digitally controlled switch 207, a standard PLL (phase locked loop) tone detector 201-204 such as the LM567 chip (manufactured by National Semiconductor Corporation) can be used to detect many different frequencies under processor control, while eliminating calibration difficulties during manufacture and stability and drift problems during use.

The processor 206 in the control unit 50 (FIG. 2) of the present invention adjusts the frequency of the PLL by removing the input signal from the phase detectors 201, 202, by switching the controlled switch 207. This allows the PLL to drift to its natural center frequency. Then the processor 206 can measure the frequency of the voltage controlled oscillator (VCO) 204 and adjust the digitally controlled resistor 205 to set the center frequency to the desired range. Thus, no precision components are required (except for the time base 92 of the processor 206), no manual adjustments are required, and by periodically re-adjusting the center frequency when not in use, all drift due to temperature, humidity, voltage and aging can be compensated for.

The operation of the tone detector shown in FIG. 6 is as follows:

1. The switch 207 connects the input signal to the phase detectors 201, 202, and the "I PHASE DETECTOR" 201 compares the input signal to (the transfer tone or "beep" from the answering machine) the output frequency of the VCO 204. When the frequencies are the same, the output filter capacitor 210 is discharged; when the frequencies are different, the output filter capacitor 210 is charged. The signal level on the output filter capacitor 210 indicates the closeness in frequency of the input signal to the VCO 204 output.

2. The "Q PHASE DETECTOR" 202 compares the input signal to the VCO 204 output frequency. The frequency difference charges or discharges the loop filter capacitor 211 to adjust the VCO 204 frequency to match the input signal.

3. When the voltage across the output filter capacitor 210 reaches a threshold voltage, the output of the buffer amplifier 203 will be at low level (i.e. it will sink current). When the voltage is below the threshold, the buffer amplifier 203 output will go to a high impedance. The output of the buffer amplifier 203 is used as a logical indication of tone detection and is sensed by processor 206.

4. The VCO 204 is a voltage controlled oscillator. The voltage level on the input signal "LOOP" varies the frequency of the oscillator 204 over a fairly narrow range (typically less than 14%). In addition, the resistance between the VCO output and VCO input, and the capacitance between the VCO input and ground, control the frequency of VCO 204 over a long period of use.

5. The digitally variable resistor 205 provides a current path between the VCO output and the VCO input. The value of the resistance 205 inversely affects the output frequency of the VCO 204. As the resistance increases, the frequency of VCO 204 decreased proportionally. This variable resistor 205 controls the center frequency detection of the PLL detector.

6. The processor 206 in the control unit 50 detects tone presence by the output buffer amplifier 203 being at low level (i.e., sinking current to ground). When tones are not being detected and the processor has spare time, the frequency of VCO 204 can be adjusted as follows:

A. The digitally controlled switch 207 disconnects the input signal from the phase detectors 201 and 202 under control of the signal mute line from processor 206.

B. An approximation of the correct resistance value for controlled resistance 205 is made based on the values of components used in the design and any experience gained in previous adjustments.

C. The controlled resistor 205 is set.

D. The PLL is allowed time to stabilize.

E. The frequency of the VCO 204 is measured. This is done by counting pulses on the VCO output for a period of time either using software or available processor hardware.

F. The actual output frequency from VCO 204 is compared to the desired frequency by the processor 206. If they are within an acceptable tolerance, calibration is complete.

G. Steps B through F are repeated as necessary to bring the frequency of the VCO 204 to the desired acceptable tolerance.

7. The digitally controlled switch 207 connects or disconnects the input signal from the two phase detectors 201, 202 under control of the processor 206. This switch is used during calibration in order to allow the VCO 204 of the PLL to drift to center frequency instead of trying to track the input signal.

The above-described tone detector of the present invention is advantageous for the following reasons. First, this system is relatively inexpensive since high tolerance components are not required. Low cost components can be used, thereby simplifying design and reducing the cost of the overall system, while still providing a high degree of reliability. The system is advantageous since it eliminates two problems. First, it makes the system configurable to most brands and models of answering machines. Second, it eliminates the calibration and drift problems associated with most analog PLL tone detectors by allowing the processor to periodically calibrate the system automatically, after initial settings are made, to always insure proper operation.

Figure 7:
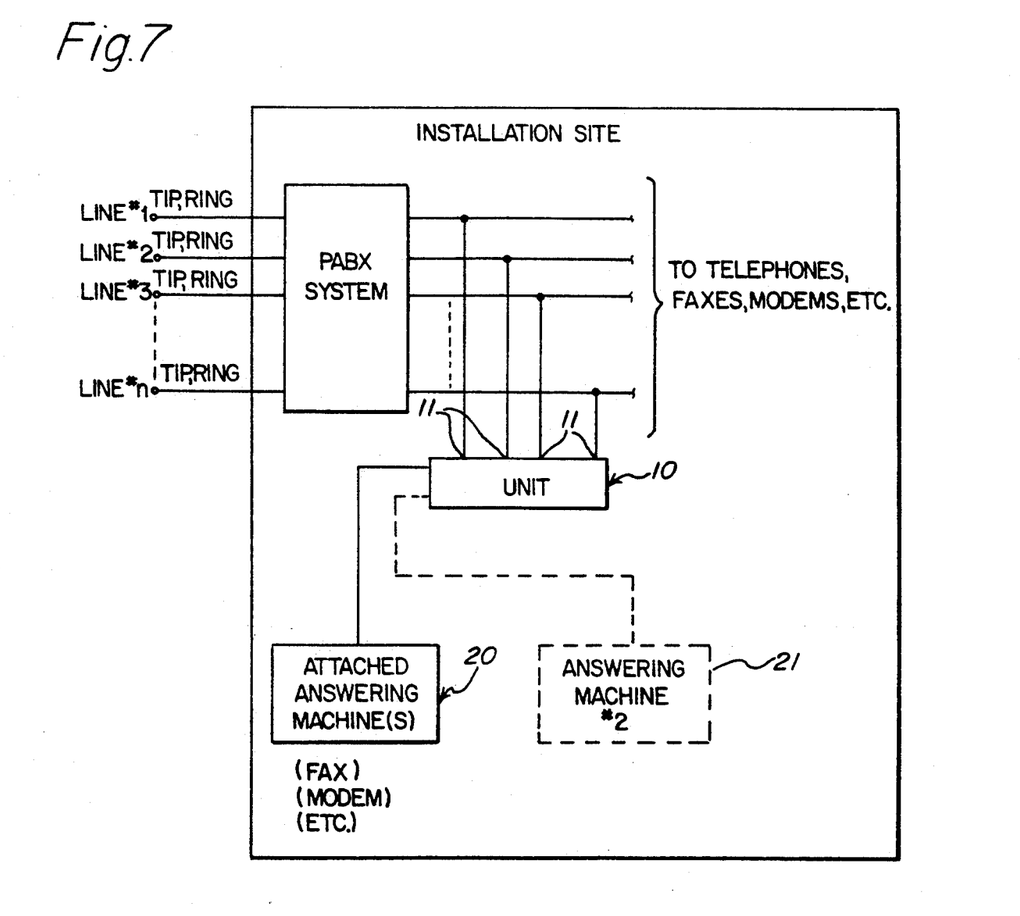

FIG. 7 illustrates a modified embodiment wherein the unit 10 of the present invention is connected to the output of a PABX system or the like, and in parallel with the telephones, faxes, modems, etc. Operation of this system is identical to the previously described system, but this arrangement provides a more flexible system. A PABX includes switching means for switching incoming calls to free telephones or the like to avoid busy signals. The unit 10 of the present invention will handle answering of the switched calls on the free lines from the output of the PABX in the manner described above with respect to the first embodiment.

As shown in FIG. 2, a selector switch 82 is preferably provided to input a value to control unit 50 for generation of a "center frequency adjust" signal which is coupled to digital controlled resistor 205 of FIG. 6. For example, a listing may be provided which lists various answering machines presently in production, and which provides a setting "A", "B", etc. for switch 82, depending upon the answering machine being used. This setting will set the control unit 50 to generate a particular signal on output line 212 in FIG. 6 to adjust the digitally controlled resistor 205 to cause the VCO 204 to have a nominal center frequency corresponding to the particular answering machine in use. The listing of answering machines, and the corresponding settings of switch member 82, may be updated periodically.

Figure 8:
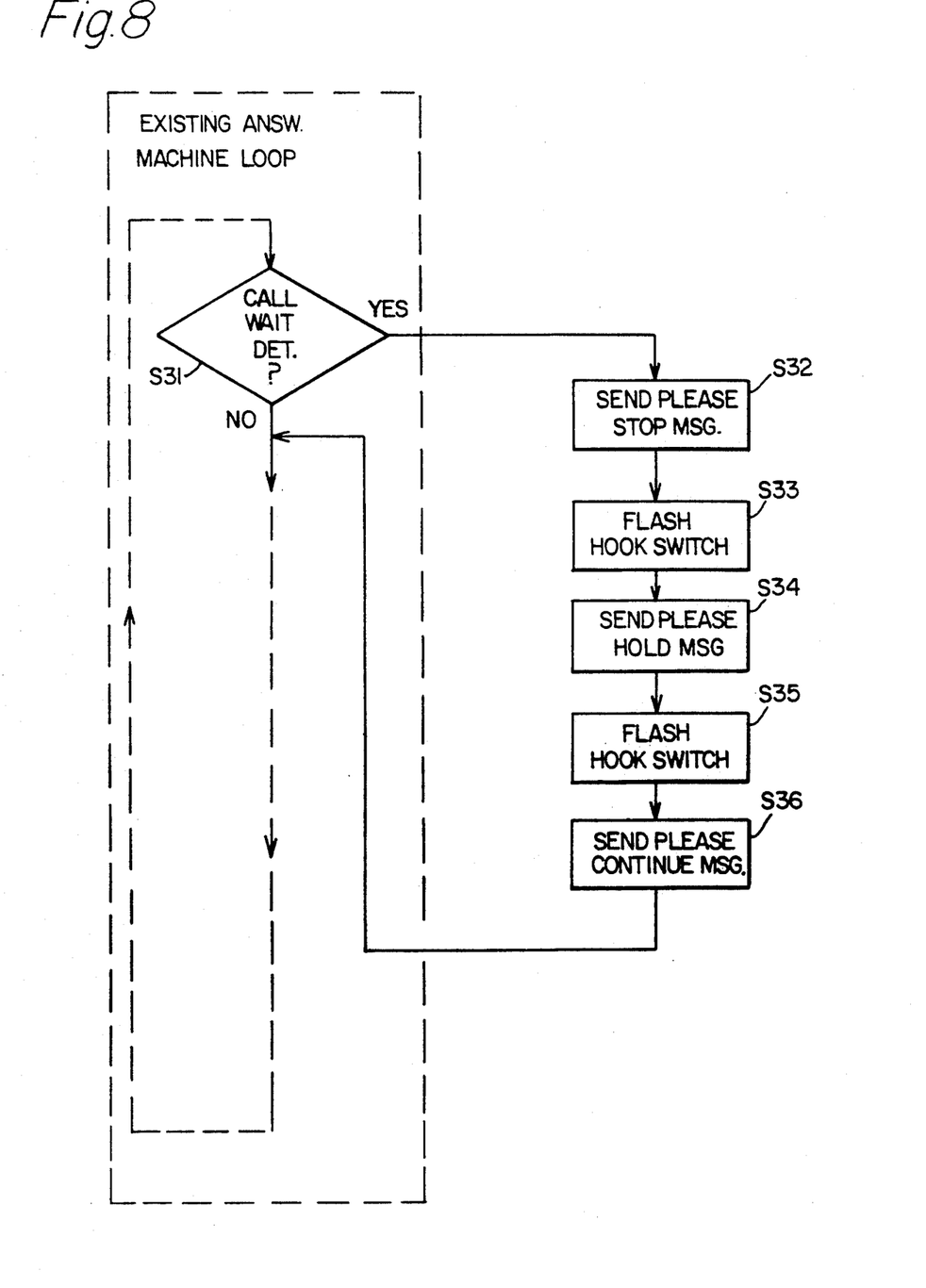
FIG. 8 is flow chart showing how the system operates when one or more lines has a "call waiting" feature.

FIG. 8 is a flow chart showing how the system operates when one or more lines has a "call waiting" feature.

The code to carry out the flow chart of FIG. 8 is added in addition to existing code in the processor (CPU) of either the present invention or of any standard telephone answering machine. This is done by adding an additional test S31 in the existing program in the main incoming call record loop. This test will then temporarily branch out of the standard loop to answer the second incoming call on "call waiting" and ask them to hold while the first call processing is being completed. The flow chart of FIG. 8 is described below.

S31. On detection of the signal sent by the telephone central office to indicate a second call is on the single-line phone line (call waiting), the program flow branches off to step S32. Otherwise, the existing loop (see FIG. 4) is maintained.

S32. The call being recorded is interrupted by the control unit 50 and the output of the voice synthesizer 70 is connected to the phone line. A prestored or prerecorded message is sent by the voide synthesizer 70 to the first caller stating that, for example, the recording has been temporarily interrupted and to please wait a moment.

S33. The loop current between tip and ring of the line being handled is momentarily broken by the associated line circuit 100 under control of the control unit 50 as per standard practice to tell the central office to switch to the second incoming call.

S34. The control unit 50 connects the output of the voice synthesizer 70 to the phone line. A prestored or prerecorded message is sent to the second caller that says something to the effect that their call has been answered and to please hold on a moment.

S35. The loop current between tip and ring is momentarily broken again by the line circuit 100 as per standard practice to tell the central office to switch back to the first incoming call.

S36. The control unit 50 connects the output of the voice synthesizer 70 to the phone line. A prestored or prerecorded message is then sent to the first caller that says something to the effect that the first caller can continue leaving the remainder of their message.

It is noted that there is no special programming required for switching back to the second incoming call that was on "call waiting". This is handled by the fact that after the unit hangs up on the first caller, the central office will ring the phone again for the second caller. The unit of the present invention will then automatically answer the "second" call at that point and handle it normally. This system is usable on a single line phone system having a call waiting feature, or on a multi-line system wherein one or more lines has a call waiting feature.

While the invention has been described above with respect to specific embodiments and specific implementations, it should be clear to one of ordinary skill in the art that various changes and modifications can be made within the spirit and scope of the invention as defined in the accompanying claims.

What is claimed is:

1. A multi-line telephone switching system for processing and answering incoming telephone calls on a subscriber's premises after said incoming calls are received on a plurality of incoming telephone lines connected to a remote central station, said multi-line telephone switching system being connected to said incoming telephone lines and comprising:

a single one-line answering machine for selectively transmitting information to and receiving information from said incoming lines on a one-at-a-time basis; and control means coupled to said plurality of incoming telephone lines and to said answering machine for switching incoming calls on any of said lines to said answering machine on a one-at-a-time basis after a preselected number of rings on a called line including zero rings, said control means including means for picking up and holding received incoming calls on any of said lines only when said answering machine is busy processing a previously received call, and connecting means for connecting the thus held calls on said one-at-a-time basis to the answering machine upon completion of the processing of the previously received call by the answering machine, said connecting means including ring signal generating means for generating a ring signal that is provided to the answering machine after the answering machine completes processing of the previously received call.

2. A multi-line telephone switching system according to claim 1, wherein said control means includes disconnect sensing means for sensing whether a call on hold has been disconnected.

3. A multi-line telephone switching system according to claim 2, wherein said control means includes means for releasing a call on hold when said disconnect sensing means senses that said call on hold has been disconnected.

4. A multi-line telephone switching system according to claim 2, wherein: said means for picking up and holding incoming calls includes means for picking and holding a plurality of incoming calls on said lines; and said control means includes voice means for providing at least one outgoing announce message on the lines being held on hold for later connection to the answering machine.

5. A multi-line telephone switching system according to claim 4, wherein said control means causes said voice means to periodically provide said at least one outgoing announce message.

6. A multi-line telephone switching system according to claim 5, wherein said control means causes said voice means to generate different outgoing announce messages at different times.

7. A multi-line telephone switching system according to claim 4, wherein said voice means comprises a speech synthesizer.

8. A multi-line telephone switching system according to claim 1, wherein said control means is connected in parallel to equipment connected to said incoming lines.

9. A multi-line telephone switching system according to claim 1, wherein said control means includes manually operable switch means for selectively disabling answering of an incoming call on at least one of said incoming lines.

10. A multi-line telephone switching system according to claim 1, wherein said control means further comprises indicator means for displaying the status of the respective incoming lines.

11. A multi-line telephone switching system according to claim 1, wherein said control means further comprises means for setting the number of rings after which a call is switched to said answering machine.

12. A multi-line telephone answering system for answering telephone calls on a subscriber's premises after said calls are received on a plurality of telephone lines that are connected to a remote central station, a plurality of subscriber utilization devices being connected to said lines, the system comprising:

switching means coupled to said lines and to said utilization devices for transferring received incoming calls from busy utilization devices to free utilization devices;

control means coupled to said switching means and including means for picking up and holding the incoming calls when each said incoming call is not answered after a preselected number of rings on a called line, including zero rings, by a free utilization device; and a single one-line answering machine means coupled to said control means for answering received incoming calls on a one-at-a-time basis which are not answered after said preselected number of rings;

said picking-up and holding means of said control means including queuing means for queuing received incoming calls to use the answering machine means only when the answering machine means is busy processing a previously received call, and ring signal generating means for generating a ring signal to the answering machine means upon completion of the processing of the previous call by said answering machine means.

13. A multi-line telephone answering system according to claim 12, wherein said control means includes disconnect sensing means for sensing whether a call on hold has been disconnected.

14. A multi-line telephone answering system according to claim 13, wherein said control means includes means for releasing a call on hold when said disconnect sensing means senses that said call on hold has been disconnected.

15. A multi-line telephone answering system according to claim 13, wherein said control means includes voice means for providing at least one outgoing announce message on the lines being held on hold for later connection to the answering machine.

16. A multi-line telephone switching system according to claim 15, wherein said control means causes said voice means to periodically provide said at least one outgoing announce message.

17. A multi-line telephone switching system according to claim 16, wherein said control means causes said voice means to generate different outgoing announce messages at different times.

18. A multi-line telephone switching system according to claim 12, wherein said control means is connected in parallel to said utilization devices connected to said incoming lines.

19. A multi-line telephone switching system according to claim 12, wherein said control means includes manually operable switch means for selectively disabling answering of an incoming call on at least one of said incoming lines.

20. A multi-line telephone switching system according to claim 12, wherein said control means further comprises indicator means for displaying the status of the respective incoming lines.

21. A multi-line telephone switching system according to claim 12, wherein said control means further comprises means for setting the number of rings after which a call is switched to said answering machine.

22. In a telephone system having a plurality of incoming lines that are connected between a remote central station and a plurality of subscriber utilization devices connected to said lines, a telephone switching system located on a subscriber's premises for answering telephone calls after said calls are received on said telephone lines, said telephone system being connected in parallel with said incoming lines for answering preselected incoming calls, said telephone switching system comprising:

a single one-line answering machine means for transmitting information to and receiving information from any of said incoming lines on a one-at-a-time basis;

control means coupled to said incoming lines and to said answering machine means for transferring incoming calls on any of said lines to said answering machine after a preselected number of rings on a called line, including zero rings; and pick-up and holding means included in said control means for picking up and holding subsequently received incoming calls on any of said lines only when said answering machine means is busy processing a previously received call, and for connecting on a one-at-a-time basis the calls placed on hold to the answering machine means, said picking and holding means including ring signal generating means for generating a ring signal that is provided to the answering machine after the answering machine completes processing of the previously received call.

23. In the telephone system of claim 22, wherein said control means includes detector means for sensing ring signals appearing on said incoming lines.

24. In the telephone system according to claim 22, wherein said pick-up and holding means includes means for queuing the incoming calls for transfer of said calls to the answering machine means on a preselected priority basis.

25. In the telephone system of claim 24, wherein said control means includes means for providing an outgoing announce message on the lines being held on hold for subsequent connection to the answering machine means.

26. In the telephone system of claim 25, wherein said control means includes disconnect sensing means for detecting the disconnection of an incoming call, and means for controlling said pick-up and holding means for eliminating a disconnected call from the queue.

27. In the telephone system of claim 24, wherein said preselected priority basis is the time of receipt of the incoming call.

28. In the telephone system of claim 24, wherein said control means includes disconnect sensing means for detecting the disconnection of an incoming call, and means for controlling said pick-up and holding means for eliminating a disconnected call from the queue.

29. In the telephone system of claim 22, wherein said control means includes disconnect sensing means for detecting the disconnection of an incoming call, and means for controlling said pick-up and holding means for eliminating a disconnected call from the queue.

30. A method of answering and processing incoming telephone calls on a subscriber's premises after said incoming calls are received on a plurality of incoming telephone lines from a remote central station by means of a subscriber's single one-line answering machine, comprising:

selectively transmitting information to and receiving information from said incoming lines;

switching received incoming calls on any of said lines to said answering machine after a preselected number of rings on a called line including zero rings;

picking up and holding incoming calls on any of said lines only when said answering machine is busy processing a previously received call; and automatically connecting one of the thus held calls to the answering machine upon completion of the processing of each previously received call by the answering machine, said automatic connecting step including the step of providing a ring signal to the answering machine after the answering machine completes processing of the previously received call.

31. The method according to claim 30, further comprising sensing whether a call on hold has been disconnected.

32. The method according to claim 31, further comprising releasing a call on hold when it is sensed that said call on hold has been disconnected.

33. The method according to claim 30, further comprising providing at least one outgoing announce message on the lines being held on hold for later connection to the answering machine.

34. The method according to claim 33, comprising periodically providing said at least one outgoing announce message.

35. The method according to claim 34, comprising generating different outgoing announce messages at different times.

36. The method according to claim 30, comprising selectively disabling answering of an incoming call on at least one of said incoming lines.

37. The method according to claim 30, further comprising displaying the status of the respective incoming lines.

38. The method according to claim 30, further comprising setting the number of rings after which a call is switched to said answering machine.

39. In a multi-line telephone answering system including a plurality of telephone lines connected to a remote central station, a plurality of subscriber utilization devices connected to said telephone lines, and a single one-line answering machine means, the method for answering and processing incoming calls received on said lines on a subscriber's premises comprising:
    transferring each received incoming call from a busy utilization device to a free utilization device;
    picking up and holding each received incoming call if said incoming call is not answered after a preselected number of rings on a called line, including zero rings, by said free utilization device;
    answering each of the incoming calls by said answering machine means on a one-at-a-time basis when a call is not answered by a utilization device after said preselected number of rings; and
    queuing the received picked up and held incoming calls to use the answering machine means only when the answering machine means is busy processing a previously received call, and means for generating a ring signal to the answering machine means upon completion of the processing of each previous call by said answering machine means.

40. In a multi-line telephone answering system according to claim 39, further comprising;
    sensing whether a call on hold has been disconnected; and
    releasing a call on hold when it is sensed that said call on hold has been disconnected.

41. A multi-line telephone answering system according to claim 39, further comprising providing at least one outgoing announce message on the lines being held on hold for later connection to the answering machine means.

42. In a telephone system having a plurality of incoming lines connected to a remote central station, a plurality of utilization devices connected to said lines, a telephone switching system located on a subscriber's premises connected in parallel with said incoming lines for answering preselected incoming calls, and a single one-line answering machine means, a method of processing and answering incoming calls after said incoming calls are received on said plurality of lines, comprising:
    connecting the answering machine means for transmitting information to and receiving information from any of said incoming lines on a one-at-a-time basis;
    transferring a received incoming call on any of said lines to said answering machine after a preselected number of rings, including zero rings and when an incoming call is directed to a busy line; and
    picking up and holding a received incoming call on any of said lines whenever said answering machine means is busy processing a previously received call, and then connecting a call placed on hold to the answering machine means upon completion of processing of said previously received call by said answering machine means, said connecting step including a step of providing a ring signal to the answering machine after the answering machine completes processing of the previously received call.

43. A telephone switching system for automatically answering incoming telephone calls received on at least a "single line" telephone line that is connected on a subscriber's premises between a remote central station and a subscriber utilization means, said at least one "single line" being provided with a call waiting capability in which a signal tone ("beep") appears on said single line if a second call is trying to access said line whenever said line is busy with a previously received call and in which the second call can be accessed by momentarily depressing a hook switch of a telephone, said telephone switching system being coupled to said at least single line on a subscriber's premises, comprising:
    an answering machine for selectively transmitting information to and receiving information from calling parties on said incoming line on a one-at-a-time basis;
    control means coupled to said incoming telephone line and to said answering machine for switching an incoming call received on said line to said answering machine after a preselected number of rings including zero rings, said control means including means responsive to said signal tone for picking up and holding the second incoming call on said line whenever said answering machine is busy processing a previously received call, and means for connecting the thus held second call to the answering machine upon completion of the processing of the previously received call by the answering machine.

44. The telephone switching system according to claim 43, wherein said control means further comprises:
    means for interrupting a first incoming call responsive to said signal tone and for announcing to said first caller that the call will be interrupted;
    said picking up and hold means picking up and holding the second incoming call after said first incoming call is interrupted, and announcing a message to said second incoming call;
    means for reconnecting said first incoming call after said message to said second incoming call, and for placing said second incoming call on hold; and
    said connecting means connecting said second call to the answering machine upon completion of the processing of the previously received first call by the answering machine.

* * * * *